METHOD OF VACUUM DEPOSITING SUPERCONDUCTIVE METAL COATINGS

Filed Dec. 31, 1959

JOHN N. COOPER
EUGENE C. CRITTENDEN, Jr.
*INVENTORS*

BY Jerry A. Dinardo
*AGENT*
Albert Rosen
*ATTORNEY*

United States Patent Office 3,113,889
Patented Dec. 10, 1963

3,113,889
METHOD OF VACUUM DEPOSITING SUPERCONDUCTIVE METAL COATINGS

John N. Cooper, Carmel, and Eugene C. Crittenden, Jr., Monterey, Calif., assignors to Space Technology Laboratories, Inc., a corporation of Delaware
Filed Dec. 31, 1959, Ser. No. 863,138
13 Claims. (Cl. 117—217)

This invention relates generally to improvements in the art of depositing thin films, and more particularly to improved arrangements for forming thin-metal superconductive films.

In the investigation of the electrical properties of materials at very low temperatures it has been found that the electrical resistance of many materials drops abruptly as the temperature is lowered to that close to absolute zero (zero degrees Kelvin)—the material in such a state being termed superconductive. Superconductive materials have been used to construct computer circuit components of increased speed and reduced size, superconductive materials lending themselves to the performance of switching operations within a millimicrosecond and to the provision of memory densities of hundreds of thousands of memory units per cubic foot. Such switching speeds and memory densities give rise to the need for thin metallic films of high precision (the dimension of a thin film computer component often critically determines its functional characteristics) and high structural strength (the mechanical failure of a single memory unit would result in the incapacitation of the entire memory). For example, it has been determined that the thickness dimension of a thin film superconductive switch element is a critical factor in establishing both the electrical current level of the input signal to which the element responds as well as the speed of the response of the element to an input signal of a given level. Since these elements are very thin to begin with, say of the order of .4 micron or less in thickness, any slight non-uniformities in the thickness dimension of a given element will radically change its switching characteristics.

It is therefore an object of this invention to provide improved arrangements for making thin film superconductive elements having uniform thickness dimensions.

It is another object of this invention to provide an improved method of vacuum depositing a thin film superconductive element on a substrate, and wherein the element is virtually free from thickness non-uniformities and exhibits an appreciable mechanical integrity.

It has been found that thin superconductive films formed by vacuum deposition on a substrate are improved as to thickness uniformity by reducing the substrate temperature during deposition, the lower the temperature the more uniform the film. However, it has also been found that a reduction in substrate temperature is accompanied by increased tensile stress developed in the superconductive film. As the temperature is reduced the tensile stress rises to such an extent as to eventually cause the film to rupture and even break away from the substrate, thereby destroying the physical integrity and electrical continuity of the film. Furthermore, such superconductive films, as used in the aforementioned computer application, are often sandwiched between thin films of non-superconductive material—and this non-superconductive material requires a relatively high temperature in order to assure its structural integrity. Thus various kinds of ordinarily mutually exclusive fabrication requirements are involved in the construction of superconductive computer components.

According to the invention, an improved method is provided for depositing thin film superconducting elements in vacuum by vapor deposition of the thin film metal on a substrate. The improved method comprises maintaining the substrate at a reduced temperature that is substantially equal to the temperature of maximum tolerable stress for a given deposited thin film thickness. By adjusting the temperature of the substrate, the lowest possible temperature is used that will produce a film that is both uniform in thickness and free from a tendency toward temperature induced ruptures that would destroy the physical integrity and electrical continuity of the film.

In a more specific embodiment of the invention, the substrate is given a base coating of some material other than the superconductive metal so as to provide a substrate deposition surface of uniform composition, and thus of uniform affinity for the atoms in the vapor stream of a superconductive metal during its vacuum deposition.

In yet another embodiment, the substrate (usually of an insulating material) is given a base coating of a metal having a high density of crystal nuclei. The atoms in the vapor stream of the superconductive metal tend to nucleate more readily on such a surface than on the surface of the substrate. The increased nucleation enhances the uniformity of the deposited film of superconductive metal.

Figures 1, 2, 4:
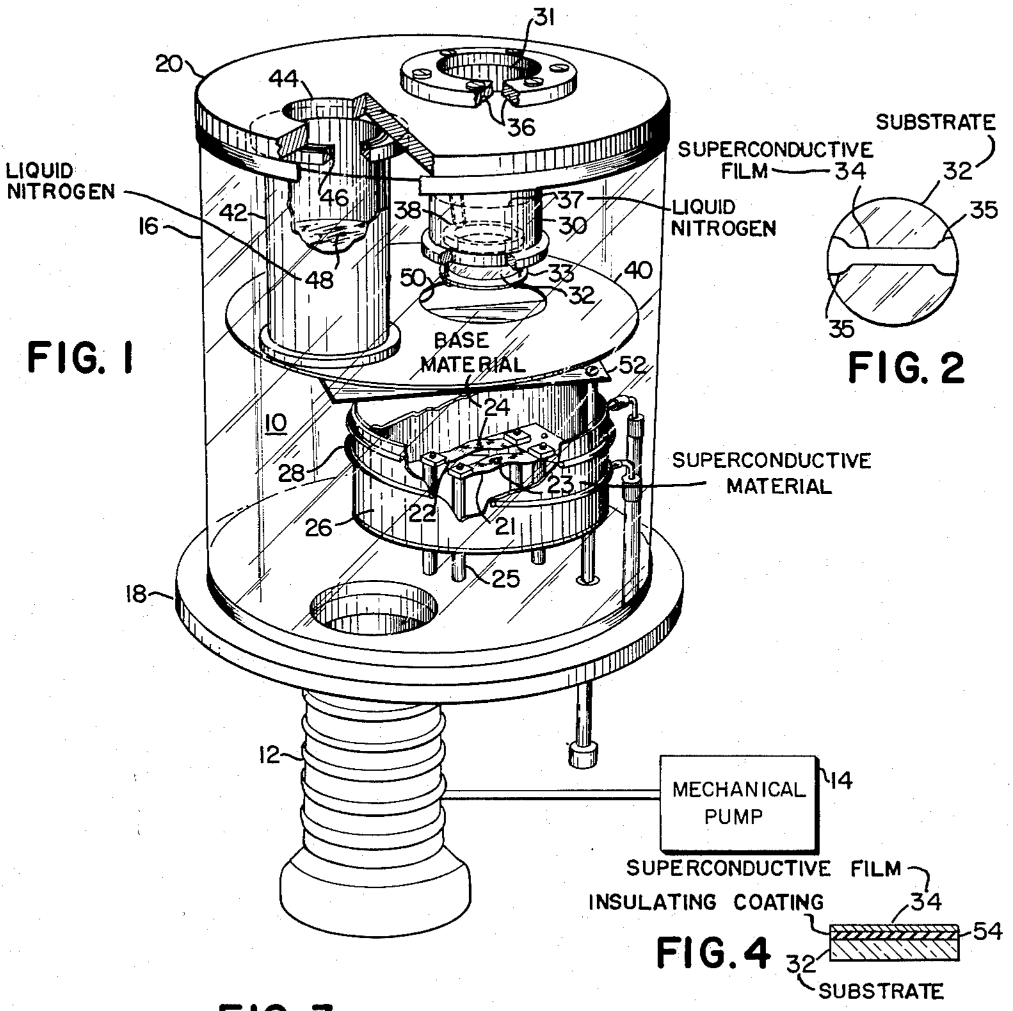
FIG. 1 is a diagrammatic view of a vacuum coating apparatus useful in carrying out the method of the invention.
FIG. 2 is a plan view of a superconductive film coated on a substrate in accordance with the method of the invention.
FIG. 4 is a sectional view of a substrate provided with a base coating of insulating material prior to the deposition of a superconductive film.

One form of vapor deposition apparatus for carrying out the method of the invention is shown schematically in FIG. 1. The apparatus includes a vacuum chamber 10 and means, including a diffusion pump 12 and a mechanical pump 14, for producing a high degree of vacuum within the chamber 10. The vacuum chamber 10 is defined by a hollow glass cylinder 16 closed at its lower end by a bottom plate 18 and at its upper end by a top plate 20.

Within the lower half of the chamber 10 is disposed an evaporator assembly that includes evaporator boats 21 and 22. One of the boats 21 contains a charge of superconductive metal coating material 23 to be evaporated, while the other boat 22 holds a charge of base coating material 24. The ends of the boats 21 and 22 are connected to metal conductors 25 which supply electrical heating current to the boats 21 and 22 from an electrical power source (not shown). A tubular metal shield 26, open at the top to permit the passage of metal vapors from the boats 21 and 22, surrounds the boats. The shield 26, which is surrounded by water cooled pipes 28, helps to prevent the radiant energy emitted by the boats 21 and 22 (during heating of the boats) from falling on the walls of the chamber 10 and other surrounding structure and effecting the evolution of gas impurities.

Within the upper half of the chamber 10 is disposed a support cup 30 for holding a substrate 32 to be coated. The substrate 32, which may be a glass or quartz plate, is cemented or otherwise fixed to the outside bottom surface of the support cup 30 so that it can be removed from the cup 30 when the coating process is completed. A mask 33 is mounted on the exposed surface of the substrate 32 to define the pattern of the superconductive film deposited on the substrate 32. As shown in greater detail in FIG. 2 the substrate 32 may support a thin superconductive film 34 of generally rectangular shape and having widened ears 35 at the ends thereof to serve as terminals for connection to a voltage source (not shown).

The support cup 30 (FIG. 1) is mounted in an opening 31 in the top plate 20 so that the inside of the cup 30 is open to the atmosphere, whereas the outside of the cup 30 is within the chamber 10. The cup 30 is provided with a sealing gasket 36 to provide a vacuum seal between the cup 30 and the chamber 10. The inside of the cup 30 holds a quantity of coolant 37, such as liquid nitrogen, for maintaining the substrate 32 at a reduced temperature during the superconductive metal coating process. In addition, an electric heater coil 38, which may be energized from an external source (not shown), is positioned in the bottom of the cup 30 so as to maintain the substrate 32 at an elevated temperature during the deposition of other coating material, such as the base coating material 24, or non-superconductive (e.g. insulating) material used in the fabrication of sandwich structures.

The vacuum pumps 12 and 14 are capable of providing a vacuum of the order of $5\times10^{-6}$ millimeters of mercury. However, considerably lower pressures than this are necessary to vacuum deposit thin film elements which are of the required purity to make them function as superconductors. In order to reduce the vacuum pressure to the required low amount, a "cold trapping" device is provided within the chamber 10. The "cold trapping" device comprises an aluminum trap plate 40 mounted intermediate the substrate 32 and the evaporator boats 21 and 22 and supported by a second cup 42 to which the trap plate 40 is joined in good thermal contact. The second cup 42 is supported in an opening 44 in the top plate 20 and is provided with a vacuum tight sealing gasket 46. The second cup 42 contains a liquid nitrogen coolant 48 to maintain the temperature of the second cup 42 and the trap plate 40 at a temperature of around 77 degrees Kelvin. The trap plate 40 has a large central opening 50 to permit the flow of the desired evaporated materials from the boats 21 and 22 to the subtrate 32. A movable masking member 52, which is free to be rotated from the outside of the chamber 10, is positioned between the boats 21 and 22 and the trap plate 40 so that it can be moved, when desired, to close off the opening 50 and interrupt the flow of metal vapor.

Since the trap plate 40 is maintained at a very low temperature, it acts like an additional pump by causing the condensation thereon of molecules of any of the gas impurities which may be evolved during the coating process. These impurities, which may be present in the charges of superconductive metal and base coating materials 23 and 24, are liberated upon the heating of the coating materials to vaporization temperature. In addition, gas impurities may be liberated from the walls of the chamber 10 and from the evaporator structures, as the temperature of those structural parts is raised somewhat during the vaporization process, notwithstanding the presence of the radiation shield 26.

The trap plate 40 is desirably placed in the central region of the chamber 10 between the evaporator assembly and the substrate 32, with the boats 21 and 22 and substrate 32 being well spaced from each other. Such a central disposition of the trap plate and wide spacing of the boats and substrate give the trap plate a high probability of trapping stray molecules of condensable vapor.

The low temperature trap plate 40 simulates an open hole through which condensable vapor molecules effuse and can not return. The "speed" of a one square centimeter of open hole through which molecules effuse is about 10 liters per second. In one form of the vacuum coating apparatus, in which the diameter of the glass cylinder 16 is 17 inches, the trap plate 40 has a total surface area, both sides included, of 2000 square centimeters. Such a plate thus acts like a pump with a speed of 20,000 liters per second for condensable vapor molecules, as compared to a speed for the conventional pumps 12 and 14 of 50 liters per second. By means of the cold trap plate 40, the vacuum inside the chamber 10 can be reduced to about $2\times10^{-8}$ millimeters of mercury, whereas without the trap plate 40, the pumps 12 and 14 can provide of only $5\times10^{-6}$ millimeters of mercury.

It has been determined that extremely uniform thin metal superconductive films can be formed on a substrate by reducing the temperature of the substrate. One of the mechanisms by which this occurs is believed to be associated with the reduced surface mobility of the metal atoms as they arrive on a low temperature substrate. It is believed that crystals of the metal first begin to grow from the initially desposed metal atoms which come to rest on the substrate, these atoms serving as the first seeds or crystal nuclei. As the crystals grow from these first seeds, later arriving atoms which have not yet come to rest are attracted to these crystals rather than to the bare substrate. The crystals continue to grow until they touch each other and merge into a continuous film. It has been determined that the mobility of the arriving atoms is reduced by reducing the temperature of the substrate; a reduction in temperature causes a greater number of arriving atoms to come to rest and serve as crystal seeds before merging with already growing crystals. By starting with a greater number of seeds, the crystals will grow into a more uniform film.

Once the crystals have started growing, some crystal faces may have a tendency to grow faster than others by a phenomenon known as the Frank spiral crystal growth mechanism, discovered by Professor F. C. Frank at the University of Bristol, England. The crystal faces that grow more rapidly are those that have a spiral dislocation ending in them. The critical condition necessary for this type of crystal growth to occur is the ability of arriving atoms to accept or reject a site on a crystal face according to the stability of the atoms in this site. It has been determined that this freedom of the atom, or its mobility, can be reduced by reducing the temperature of the substrate, thereby preventing the uneven growth of crystals.

While the phenomena discussed above would appear to dictate that the temperature of the substrate should be maintain as low as possible, there is a different effect which works against reducing the substrate temperature; namely, that the tensile stress developed in a vacuum deposited metal film increases as the temperature of the substrate is reduced. The increased stress is believed to be associated with the reduced mobility, or freedom, of the atoms in permitting them to find their proper locations on the growing crystal lattice. As the atoms become buried in subsequent layers, they succumb to the increased forces tending to rearrange them. In the rearrangement to the proper crystal structure, the volume of the metal is reduced and tensile stress is thus developed in the film. As the thickness of the film builds up, the tensile forces may increase to the point where they ultimately cause the film to rupture in spots, or even peel from the substrate.

According to the invention, a critical temperature is set forth for the deposition of thin superconductive films. This critical temperature assures that the deposited films will have the required high degree of uniformity in thickness and will also be free from temperature induced ruptures. The optimum temperature is found to be that temperature at which the maximum tolerable stress is developed in the film without giving rise to a tendency toward film rupture.

Figure 3:
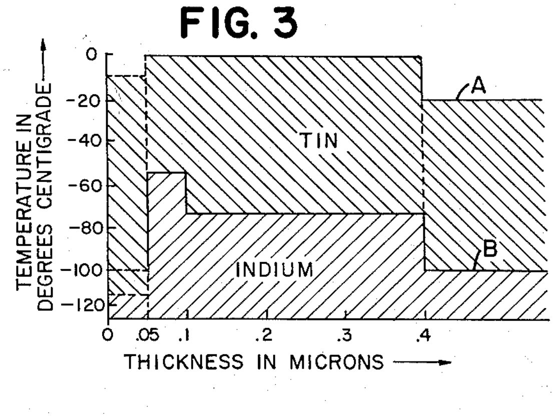
FIG. 3 is a series of graphs illustrating the optimum values of deposition temperature for superconductive films of tin and indium.

FIG. 3 shows graphically the optimum deposition temperatures for various ranges of film thicknesses of tin (graph A) and of indium (graph B). Referring to grap A, it is seen that for tin, the optimum deposition temperature remains constant at zero degrees centigrade as the film thickness is increased from .05 micron to .4 micron. For thicknesses below .05 micron, the temperature must be reduced below zero degrees, depending on the thickness, in order to improve the uniformity. In this small thickness range the temperature can be reduced by substantial amounts before the tensile forces reach the rupture point. For thickness above .4 micron, the temperature must be reduced to —20 degrees centigrade in order to overcome non-uniformity caused by unequal rates of crystal growth.

Referring to graph B, indium shows a similar characteristic in requiring lower temperatures in the thinnest ranges, below .05 micron, and in the thickest ranges, above .4 micron. For thicknesses smaller than .05 micron, the temperature must be reduced below —100° C. in order to provide adequate uniformity. For a film thickness between .05 and .1 micron, the temperature must be raised to —50° C. to prevent ruptures. For film thicknesses above .1 micron, the non-uniformity caused by unequal crystal growth becomes a more serious problem. Thus the temperature must be lowered to —70° C. for thicknesses between .1 and .4 micron, and then to —100° C. for film thicknesses above .4 micron.

In carrying out the method of the invention, the apparatus is assembled as shown in FIG. 1 and the chamber 10 is evacuated. When the desired evacuation pressure is reached (of the order of $2\times10^{-8}$ millimeters of mercury), heating current is applied to the evaporator boat 21 to melt the superconductive metal charge 23 and cause the metal vaporization to begin. At this stage, the masking member 52 is positioned between the boat 21 and the substrate 32 so that no metal is deposited on the substrate.

During this time the support cup 37 is partially filled with liquid nitrogen to reduce the temperature of the substrate 32 to the desired value. A thermocouple (not shown) may be connected to the substrate 32 to indicate when the desired temperature is reached. When the desired temperature is indicated, and when sufficient time has elapsed so that the vaporization is proceeding at a uniform rate, the masking member 52 is rotated out of masking position so as to permit the flow of metal vapors on to the substrate 32. At the end of a predetermined time, when the desired thickness of metal has been deposited, the masking member is rotated to its masking position to terminate the deposition. The coolant 37 in the support cup 30 is then removed to return the substrate to room temperature.

It has been found that the surface conditions of the substrate may cause non-uniformities in the thickness of the deposited metal film. For instance, surface scratches that are present in a polisehd substrate surface may contain minute amounts of foreign material. The foreign material in these scratches may have a different affinity for the metal vapor atoms from that of the substrate material. The metal atoms will tend to build up preferably in the areas where the affinity for them is greater, thus giving rise to thickness non-uniformities.

In order to overcome this effect, it is preferred to coat the substrate 32 (FIG. 4) with a very think base coating 54 prior to the deposition of the superconductive metal film 34. The coating 54 may be vapor deposited by heating the base coating material 22 in the boat 24. Such a base coating 54 will cover up the substrate surface non-uniformities and give the substrate a surface that is uniform in composition and thus one having the same affinity, over all surface areas, for metal vapor atoms. Insulating films such as silicon monoxide, magnesium fluoride, and zinc sulfide are suitable for this purpose. Such a coating 54 may itself at first have some thickness non-uniformities due to variation in surface affinity. However the non-uniformities virtually disappear after a thickness of the order of 500 angstrom units has been deposited.

When the base coating 54 of insulating material is applied, the substrate 32 is maintained at an elevated temperature. For example, a base coating 54 of zinc sulfide is deposited at 100° C. When serving as a base for tin, silicon monoxide is deposited at 150° C.; when serving as a base for indium, the silicon monoxide is deposited below 135° C. The heater coil 38 may be used to raise the temperature of the substrate 32 to the desired value. The coil 38 may also be used to heat the substrate 32 in the event that it is desired to employ other coatings of insulating material sandwiched between superconductive metal elements.

Figure 5:
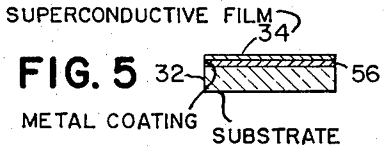
FIG. 5 is a sectional view of a substrate provided with a base coating of metal prior to the deposition of a superconductive film.

Another method of reducing the surface roughness of the superconductive metal film 34 is to precoat the substrate 32 (FIG. 5) with a very thin base layer 56 of a metal having a relatively high melting point and a corresponding low surface mobility of its atoms. Such a coating 56 will have a high density of crystal nuclei. In general, the superconductive metal atoms, such as the atoms of tin or indium, will nucleate on these tiny metal crystals in preference to nucleation on the substrate surface, and start a very uniform film. The metal base coating 56 should be very thin to avoid the electrical short circuiting of the superconductive film, as the base coating 56 is electrically in parallel with the superconductive film 34. The metal base coating 56 should also be very thin to avoid stress failure within it. Thicknesses of 10 to 50 angstrom units are suitable for the metal base coating 56. Antimony is especially well suited as a base coating for superconductive indium, with the antimony being deposited at room temperature. Such a combination may give rise to the formation of a thin layer of the compound indium-antimonide at the junction between the antimony and indium. This compound, which is a semi-conductor with a very high resistivity, may assist in reducing the electrical short circuiting effect of the antimony.

By employing a base coating 56 of thin metal, the substrate temperature may be increased somewhat for the deposition of intermediate superconductive film thicknesses, which for indium is in the vicinity of .05 micron in thickness. For larger thicknesses, differential crystal growth predominates and the use of a metal base coating is less effective. For much smaller thicknesses of superconductive metal the metal base coating becomes rather thick relative to the indium and interferes with the superconducting behavior of indium. Fortunately, the thickness range of indium that turns out to be the most adaptable for the employment of a metal base coating also turns out to yield the optimum speed of response of the indium film to an electrical current signal.

It is now apparent that by means of the improved arrangements of the invention, superconductive thin film elements can be readily formed with improved uniformity in film thickness and without temperature induced ruptures. Furthermore, by means of the novel apparatus, such films can be formed in sandwich structures and satisfy different temperature requirements.

What is claimed is:

1. A method of depositing a superconductive metal selected from the group consisting of indium and tin as a uniform film on a substrate, comprising the steps of: placing said substrate within an evacuation chamber; evacuating said chamber reducing the temperature of said substrate to a value slightly above the temperature at which rupturing occurs in a film formed on said substrate from vapors of said superconductive metal; vaporizing said superconductive metal; and, while maintaining said substrate at said reduced temperature, causing vapors of said superconductive metal to deposit on said substrate until a thickness of less than .4 micron is achieved, said reduced temperature not exceeding zero degrees centigrade.

2. A method of depositing a superconductive metal selected from the group consisting of indium and tin as a uniform film on a substrate, said method comprising the steps of: placing said substrate adjacent to a source of said superconductive metal within an evacuation chamber maintained at a pressure substantially less than 5 times $10^{-6}$ millimeters of mercury; reducing the temperature of said substrate to a value slightly above the temperature at which rupturing occurs in a film formed on said substrate from vapors of said superconductive metal; vaporizing said superconductive metal; and, while maintaining said substrate at said reduced temperature, causing the vapors of said superconductive metal to deposit on said substrate until a thickness of less than .4 micron is achieved, said reduced temperature being substantially in the range between 0 and −120 degrees centigrade.

3. A method of depositing a superconductive metal selected from the group consisting of indium and tin as a uniform film on an insulating substrate, comprising the steps of: applying on said substrate a base coating 10 to 50 angstroms thick of antimony, said coating having a higher affinity, relative to said substrate, for atoms of said superconductive metal in a vapor stream; and vacuum depositing said metal on said base coating while maintaining said substrate at a reduced temperature not exceeding zero degrees centigrade, to form a smooth continuous film of said superconductive metal.

4. A method of depositing a superconductive metal selected from the group consisting of indium and tin as a uniform film on an insulating substrate, comprising the steps of: maintaining said substrate at room temperature while subjecting said substrate to vacuum deposition of the vapors of a metal having a higher affinity, relative to said substrate, for atoms of said superconductive metal in a vapor stream, to form a metal base coating 10 to 50 angstroms thick having a high density of crystal nuclei; and vacuum depositing said superconductive metal on said metal base coating while maintaining said substrate at a reduced temperature not exceeding zero degrees centigrade to form a smooth continuous film of said superconductive metal.

5. The method according to claim 4, wherein said base coating is formed from antimony.

6. A method of depositing a superconductive metal selected from the group consisting of indium and tin as a uniform film on a substrate, said method comprising the steps of: vacuum depositing on said substrate a base coating of insulating material having a thickness of the order of 500 angstroms while maintaining said substrate above room temperature, and vacuum depositing said metal on said base coating while maintaining said substrate at a reduced temperature not exceeding zero degrees centigrade to form a smooth continuous film of said superconductive metal.

7. A method of depositing a superconductive metal selected from the group consisting of indium and tin as a uniform film on a substrate, said method comprising the steps of: vacuum depositing on said substrate a base coating of insulating material having a thickness of the order of 500 angstroms, while maintaining said substrate above room temperature, said insulating material being selected from the group consisting of silicon monoxide, magnesium fluoride, and zinc sulfide, and vacuum depositing said superconductive metal on said base coating while maintaining said substrate at a reduced temperature substantially in the range of 0 to −120° centigrade to form a smooth continuous film of said superconductive metal.

8. A method of depositing indium as a superconductive thin film on a substrate, said method comprising the steps of: placing said substrate within an evacuation chamber, evacuating said chamber, cooling said substrate to a temperature substantially within the range of −50 to −100 degrees centigrade, vaporizing said indium, and causing the vapors of said indium to deposit on said substrate as a smooth, continuous film while maintaining said substrate within said temperature range.

9. A method of depositing indium as a superconductive thin film on a substrate, said method comprising the steps of: placing said substrate within an evacuation chamber; evacuating said chamber; vacuum depositing on said substrate a base coating of insulating material having a thickness of about 500 angstrom units while maintaining said substrate above room temperature; cooling said substrate to a reduced temperature substantially within the range of −50 to −100 degrees centigrade; vaporizing said indium in close proximity to said substrate; and causing the vapors of said indium to deposit on the base coating on said substrate as a smooth, continuous film while maintaining said substrate within said reduced temperature range.

10. A method of depositing indium as a superconductive thin film on a substrate, said method comprising the steps of: placing said substrate within an evacuation chamber; evacuating said chamber; vacuum depositing on said substrate a base coating of antimony having a thickness of about 10 to 50 angstroms; cooling said substrate to a temperature substantially within the range of −50 to −100 degrees centigrade; vaporizing said indium in close proximity to said substrate; and causing the vapors of said indium to deposit on said substrate as a smooth, continuous film while maintaining said substrate within said temperature range.

11. A method of depositing tin as a superconductive thin film on a substrate, said method comprising the steps of: placing said substrate within an evacuation chamber, evacuating said chamber, cooling said substrate to a temperature substantially within the range of 0 to −20 degrees centigrade, vaporizing said tin, and causing the vapors of said tin to deposit on said substrate as a smooth, continuous film while maintaining said substrate within said temperature range.

12. A method of depositing tin as a superconductive thin film on a substrate, said method comprising the steps of: placing said substrate within an evacuation chamber, vacuum depositing on said substrate a base coating of insulating material having a thickness of about 500 angstrom units while maintaining said substrate at an elevated temperature, cooling said substrate to a temperature substantially within the range of 0 to −20 degrees centigrade, vaporizing said tin in close proximity to said substrate under vacuum conditions, and causing the vapors of said tin to deposit on the base coating on said substrate as a smooth, continuous film while maintaining said substrate within said temperature range.

13. A method of depositing tin as a superconductive thin film on a substrate, said method comprising the steps of: placing said substrate within an evacuation chamber, vacuum depositing on said substrate a base coating of antimony having a thickness of about 10 to 50 angstroms, cooling said substrate to a temperature substantially within the range of 0 to −20 degrees centigrade, vaporizing said tin in close proximity to said substrate under vacuum conditions, and causing the vapors of said tin to deposit on the base coating on said substrate as a smooth, continuous film while maintaining said substrate within said temperature range.

References Cited in the file of this patent

UNITED STATES PATENTS

| | | |
|---|---|---|
| 2,382,432 | McManus et al. | Aug. 14, 1945 |
| 2,665,228 | Stauffer | Jan. 5, 1954 |
| 2,719,097 | Auwarter | Sept. 27, 1955 |
| 2,757,104 | Howes | July 31, 1956 |
| 2,799,600 | Scott | July 16, 1957 |
| 2,820,727 | Grattidge | Jan. 21, 1958 |
| 2,909,148 | Patton et al. | Oct. 20, 1959 |
| 2,930,347 | Bulloff | Mar. 29, 1960 |
| 3,058,851 | Kahan | Oct. 16, 1962 |

OTHER REFERENCES

Buck, "Proceedings of the IRE," April 1956, pp. 482–493.

Holland, "Vacuum Deposition of Thin Flms," 1956, pp. 366 and 367.